(12) United States Patent
Martin

(10) Patent No.: US 10,455,089 B2
(45) Date of Patent: Oct. 22, 2019

(54) AUGMENTED REALITY SYSTEM FOR PRODUCT SELECTION

(75) Inventor: David Martin, Natick, MA (US)

(73) Assignee: FMR LLC, Boston, MA (US)

( * ) Notice: Subject to any disclaimer, the term of this patent is extended or adjusted under 35 U.S.C. 154(b) by 647 days.

(21) Appl. No.: 13/325,335

(22) Filed: Dec. 14, 2011

(65) Prior Publication Data
US 2012/0246027 A1    Sep. 27, 2012

Related U.S. Application Data

(60) Provisional application No. 61/466,098, filed on Mar. 22, 2011.

(51) Int. Cl.
| | |
|---|---|
| G02B 27/01 | (2006.01) |
| H04M 3/51 | (2006.01) |
| G06Q 30/00 | (2012.01) |
| H04M 3/42 | (2006.01) |
| G06F 3/16 | (2006.01) |

(52) U.S. Cl.
CPC ...... *H04M 3/5175* (2013.01); *G02B 27/0172* (2013.01); *G06Q 30/00* (2013.01); *H04M 3/42221* (2013.01); *G02B 2027/014* (2013.01); *G02B 2027/0138* (2013.01); *G02B 2027/0141* (2013.01); *G02B 2027/0178* (2013.01); *G06F 3/167* (2013.01)

(58) Field of Classification Search
CPC .................................................. G06Q 30/0627
USPC ....................................................... 705/26.63
See application file for complete search history.

(56) References Cited

U.S. PATENT DOCUMENTS

| | | |
|---|---|---|
| 6,073,115 A | 6/2000 | Marshall |
| 6,289,380 B1 | 9/2001 | Battat et al. |
| 6,744,436 B1 | 6/2004 | Chirieleison et al. |
| 6,901,430 B1 | 5/2005 | Smith |
| 7,053,916 B2 | 5/2006 | Kobayashi et al. |
| 7,337,325 B2 | 2/2008 | Ikegami et al. |
| 7,493,559 B1 | 2/2009 | Wolff et al. |
| 7,779,450 B2 | 8/2010 | Ohmori |
| 8,095,431 B1 * | 1/2012 | Ahluwalia ......... G06Q 10/0833 705/22 |
| 8,224,713 B2 * | 7/2012 | Haberman ........ G06F 17/30864 705/26.62 |

(Continued)

FOREIGN PATENT DOCUMENTS

WO    WO2007/010416    1/2007

OTHER PUBLICATIONS

International Search Report and Written Opinion; PCT/US2012/029922; B.R. Copenheaver; dated Jun. 14, 2012; 15 pp.

*Primary Examiner* — Alexis M Casey
(74) *Attorney, Agent, or Firm* — Proskauer Rose LLP

(57) ABSTRACT

Techniques for searching for products in an inventory of product are disclosed. The techniques receive data that specifies attributes of a product, search inventory of products to determine potential matches or closely related matches to at least some of the attributes of the products, generate messages based on the search of inventory to determine the potential matches, generate positional information associated with the messages and generate a set of informational depictions of the generated messages, with the informational depictions of the messages when rendered on a display device are rendered in juxtaposition with representations of the products according to the generated positional information.

15 Claims, 8 Drawing Sheets

(56) References Cited

U.S. PATENT DOCUMENTS

| | | | |
|---|---|---|---|
| 8,626,611 B2* | 1/2014 | Bravo | G01C 21/20 |
| | | | 235/375 |
| 2002/0009978 A1* | 1/2002 | Dukach | G06Q 30/02 |
| | | | 455/99 |
| 2002/0031756 A1 | 3/2002 | Holtz et al. | |
| 2002/0075282 A1* | 6/2002 | Vetterli et al. | 345/632 |
| 2003/0051255 A1 | 3/2003 | Bulman et al. | |
| 2004/0001106 A1 | 1/2004 | Deutscher et al. | |
| 2004/0233200 A1 | 11/2004 | Karren | |
| 2005/0261980 A1 | 11/2005 | Hadi | |
| 2007/0132785 A1 | 6/2007 | Ebersole, Jr. et al. | |
| 2007/0237491 A1 | 10/2007 | Kraft | |
| 2008/0074494 A1 | 3/2008 | Nemethy et al. | |
| 2008/0218331 A1 | 9/2008 | Baillot | |
| 2009/0182499 A1* | 7/2009 | Bravo | G01C 21/20 |
| | | | 701/408 |
| 2010/0030578 A1* | 2/2010 | Siddique | G06Q 10/0637 |
| | | | 705/3 |
| 2010/0146608 A1 | 6/2010 | Batie et al. | |
| 2011/0018903 A1 | 1/2011 | Lapstun et al. | |
| 2011/0153362 A1* | 6/2011 | Valin | G06Q 20/105 |
| | | | 705/3 |
| 2011/0213664 A1* | 9/2011 | Osterhout | G02B 27/017 |
| | | | 705/14.58 |
| 2011/0221657 A1* | 9/2011 | Haddick | G02B 27/017 |
| | | | 345/8 |
| 2012/0005030 A1* | 1/2012 | Valin | G06Q 20/10 |
| | | | 705/14.73 |
| 2012/0069131 A1* | 3/2012 | Abelow | G06Q 10/067 |
| | | | 348/14.01 |
| 2013/0066750 A1* | 3/2013 | Siddique | G06Q 10/0637 |
| | | | 705/27.2 |

* cited by examiner

AUGMENTED REALITY SYSTEM FOR PRODUCT SELECTION

This application claims priority under 35 U.S.C. § 119 to U.S. Provisional Patent Application Ser. No. 61/466,098, filed Mar. 22, 2011, and entitled "Augmented Reality System for Group Supervision", the entire contents of which are hereby incorporated by reference.

BACKGROUND

This invention relates to tools that assist in product purchasing.

Customers can become bewildered with the numerous choices that are available when purchasing goods. Sometimes merely finding a location where such goods are being displayed can be frustrating, especially in larges stores or selling areas. In particular, goods such as automobiles and vehicles that are on a dealer's lot can be an especially frustrating/confusing experience for some customers. For example, auto dealer lots routinely are stocked with a large selection of vehicles, many of which may satisfy needs of customers or potential customers. Typically, a customer or potential customer visits a dealer's lot and may be greeted by a sales representative. The customer may desire to initially peruse over the available inventory, but that can be a frustrating experience especially when the lot is a large lot, stocked with many vehicles of many makes/models, while the customer has some special features in mind, but does not at that initial stage desire to engage with the sales representative.

Generally, a customer could reluctantly ask for assistance from a sales representative. In a dealer's showroom the sales representative can conduct a computer search of inventory, and possible find vehicles that satisfy some of the criteria of the customer. The customer and sales representative together walk around the lot trying to find the vehicles in the lot that met the criteria.

SUMMARY

According to an aspect, a system includes one or more computer systems configured to receive data that specifies attributes of a product, search inventory of products to determine potential matches or closely related matches to at least some of the attributes of the products, generate messages based on the search of inventory to determine the potential matches, and generate a set of informational depictions of the generated messages, with the informational depictions of the messages when rendered on a display device are rendered in juxtaposition with representations of the products according to generated positional information.

According to an additional aspect, a computer program product tangibly stored on a computer readable storage device includes instructions to cause a processor to receive data that specifies attributes of a product, search inventory of products to determine potential matches or closely related matches to at least some of the attributes of the products, generate messages based on the search of inventory to determine the potential matches, generate positional information associated with the messages, and generate a set of informational depictions of the generated messages, with the informational depictions of the messages when rendered on a display device are rendered in juxtaposition with representations of the products according to the generated positional information.

According to an additional aspect, a method includes receiving by one or more computer systems data that specifies attributes of a product, searching by the one or more computer systems inventory of products to determine potential matches or closely related matches to at least some of the attributes of the products, generating by the one or more computer systems messages based on the search of inventory to determine the potential matches, generating by the one or more computer systems positional information associated with the messages, and generating by the one or more computer systems a set of informational depictions of the generated messages, with the informational depictions of the messages when rendered on a display device are rendered in juxtaposition with representations of the products according to the generated positional information.

One or more embodiments may include one or more of the following features. For the system, the system is further configured to receive information specifying physical locations of the products and generate positional information to associate the messages with the locations of the products. The system is further configured to generate an image depicting a representation of the products residing in a physical location, the image augmented with the set of informational depictions of the generated messages in juxtaposition with the representations of the products in the image. The system is further configured to cause the informational depictions to be projected onto a display device. The system is further configured to cause the informational depictions to be projected onto a set of eyeglasses comprising a display device configured to receive the informational depictions. The system is further configured to generate a representation of the products and cause the informational depictions to be projected onto a set of eyeglasses comprising a display device configured to receive the informational depictions and the generated representation of the products. The system further includes a portable computing system configured to receive the generated set of informational depictions and a set of eyeglasses comprising a display device, the display device configured to receive the generated set of informational depictions. The products are automobiles/vehicles and the one or more computer systems are further configured to generate the image and an environment containing the automobiles/vehicles and generate the informational depictions as pictorial representations that depicted over the corresponding automobiles/vehicles.

Other features are within the scope of these embodiments. Moreover, analogous features may be included in the method and computer program product embodiments with or without other features.

DESCRIPTION OF DRAWINGS

The accompanied figures are to be used in conjunction with the description below.

DETAILED DESCRIPTION

The details of one or more embodiments of the invention are set forth in the accompanying drawings and the description below. Other features, objects, and advantages of the invention will be apparent from the description and drawings, and from the claims.

Figure 1:
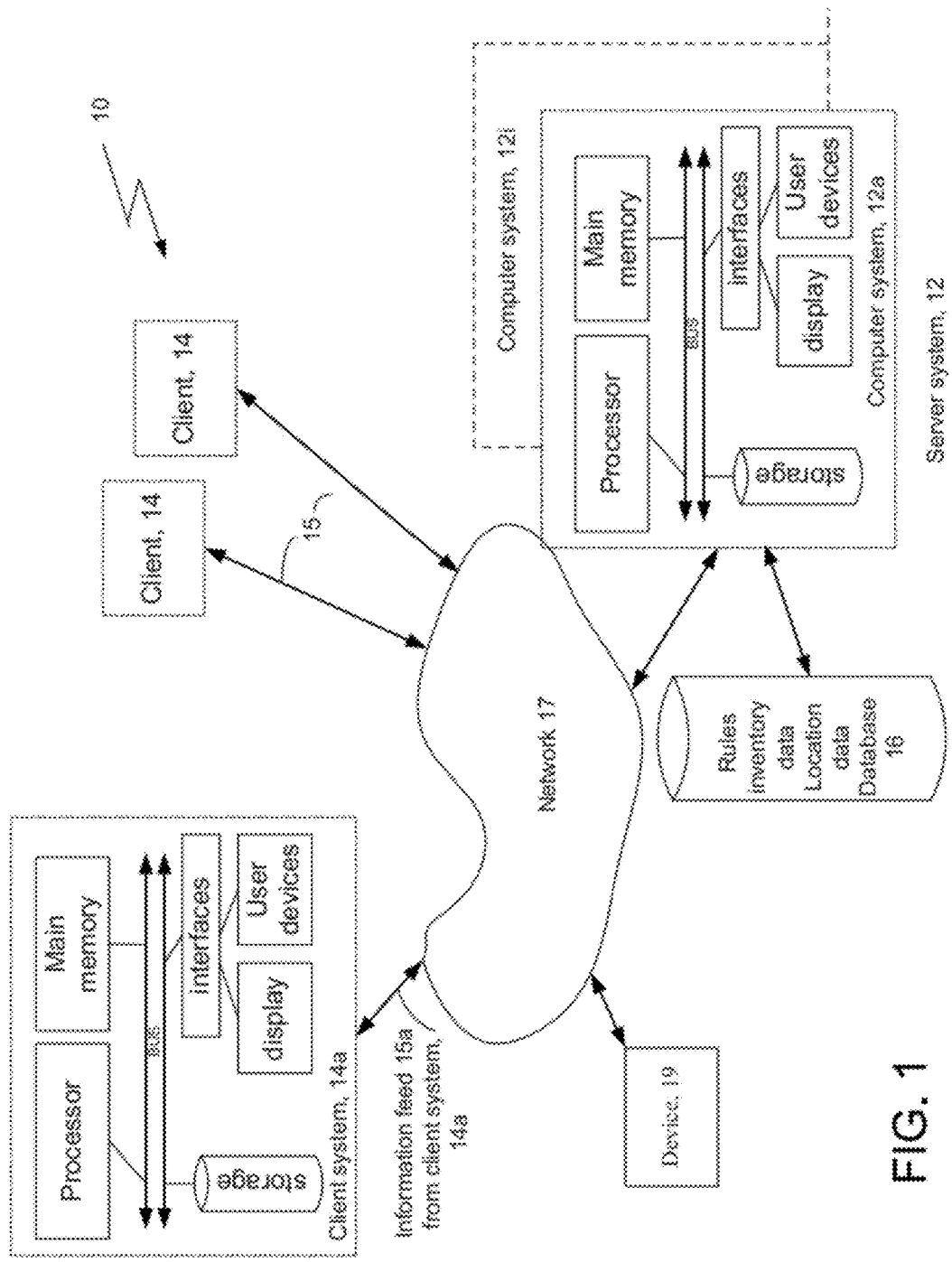
FIG. 1 is a block diagram

Referring now to FIG. 1, a system 10 includes a server type of system 12 comprised of one or more computer systems 12a-12i, each computer system 12a-12i including processor, memory and computer storage that stores a computer program product to augment an image with informational depictions. When executed, the computer program product configures the server 12 to receive input from a client system, generally 14. The input (generally 15) is received over a network 17, which can be a wired or wireless. The computer program product executing on the server 12 receives rules from a local or remote database 16 (or has rules embedded in the computer program product). The computer program product also has access to inventory information and location information, e.g., from the database 16. The inventory information includes details on the characteristics of the currently stocked inventory. Inventory can be of any type of items. One type of item is an automobile, truck, motorcycle, etc., referred to herein as "automobiles/vehicles." In some embodiments of the system 10 the client system 14 and the server system 12 can be one system. Moreover, in other embodiments there need be only one client system 14.

For items such as automobiles/vehicles, details on the characteristics can include for example, model, year, make, engine/transmission details, body type, color, manufacture suggested retail price (MSRP), dealer costs, and options, lease terms, and other information that is commonly used by customers when selecting an automobile/vehicle to purchase as well as other information not necessary used by customers when selecting an automobile/vehicle for purchase such as VIN number, location of the vehicle in the lot and so forth. The positional information that can be stored with or separately from the inventory information identifies, e.g., by VIN, a location within a physical space, such as on an automobile/vehicle dealer's lot.

Using a client-server model, a client system 14 provides information regarding what features/attributes a customer desires for a car purchase to the server 12. Typically, customers will visit a dealer and rather that talk immediately with a representative that is associated with the dealership, will be asked to input the desired characteristics at the client system 14 through a user interface, and will be issued a portable client device 19 used to display informational depictions of generated messages associated with the inventory, as discussed below. The device 19 can be any type of device capable of displaying information. Device 19 can be a display associated with a portable computer system, such as a tablet computer or a personal digital assistant or a set of virtual reality eyeglasses (or another type of augmenting media device). In some implementations of the system 10, the client system 14a is one of a plurality of portable client systems, generally 14, with each client system 14 associated with the particular device 19 (only one shown in FIG. 1). A customer can carry around one of the client systems 14 modifying user inputs as the customer tours the lot.

Figure 2:
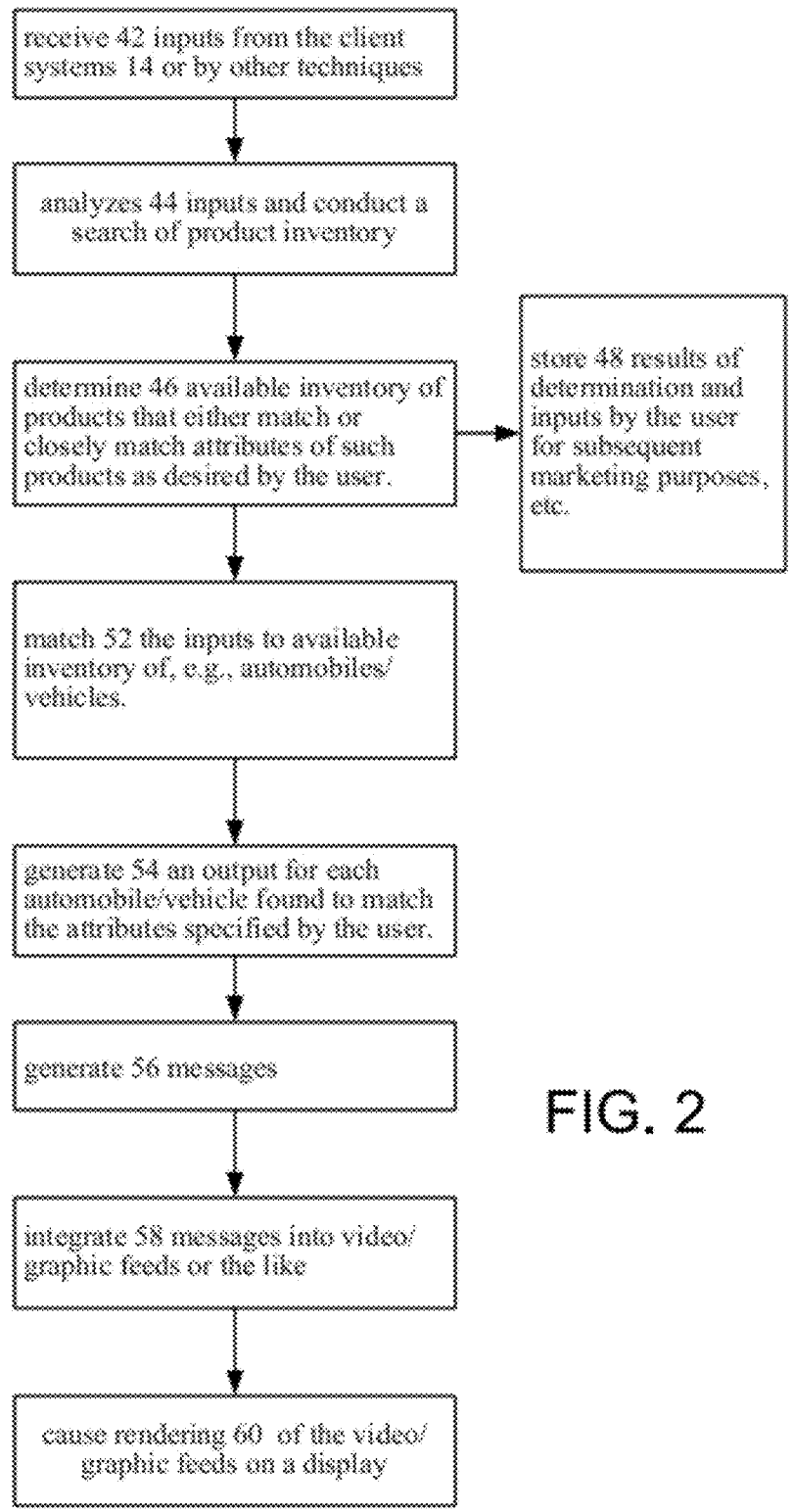
FIGS. 2 and 3 are flow chart diagrams.

Referring to FIG. 2, the system 10 receives 42 various inputs (generally 15 in FIG. 1), either directly from the client systems 14 or by other techniques and analyzes 44 those inputs and conducts a search of product inventory to determine 46 available inventory of products that either match or closely match attributes of such products as desired by the user. In a particular example where automobiles/vehicles are the type of products searched for based on attributes desired by a user, the system 10 processes, e.g., an input 15a from, e.g., a client system 14a. The system 10 analyzes the input 15a associated with the client system 14 by processing the input 15a through the set of search rules executed by a search engine to find matches of automobiles/vehicles for the customer.

The input 15a from the client system 14 can be stored 48 for later marketing purposes, such as data mining in a file or other storage structure in the database 16 or in the one or more computer systems 12a-12i. User data, such as name, address, etc. can also be collected and stored. The system 10 uses the input to match 52 the inputs to available inventory of, e.g., automobiles/vehicles. The system 10 generates 54 an output message or a file or other structure for each (or all) automobile/vehicle that is found to match the attributes specified by the user.

The matching process 40 generates 56 messages regarding the products from the dealer's inventory that match the attributes desired by the customer. The messages are integrated 58 into video/graphic feeds or the like as informational depictions for rendering on a display, as discussed below. The system causes the informational depictions to be rendered 60.

Various levels of sophistication in analysis can be applied by the rules. Relatively, simple rules, such as looking for simple matches can be implemented. Other more complex strategies can be employed, especially were no precise matches are found. Various techniques can be used to generate the messages. For example, a series of messages of increasing granularity can be generated for each matched automobile/vehicle.

Based on user-selectable/determinable combinations of priorities to different attributes different types of messages are generated. For example, at an initial search all vehicles of a certain price range are identified and messages including the prices of each of those automobiles/vehicles are generated. In addition, message of increasing granularity are also generated for each of the identified vehicles.

Typically messages are generated periodically, upon completion of the input of information at the client system 14 or when analysis detects a change an input made by the client system 14. Messages can be generated and displayed for all of the automobiles/vehicles that satisfy the criteria or only for those automobiles/vehicles currently within a field of view of device 19.

The generated messages can be relatively simple as indicated above such as data that when processed for display provides a simple visual indication that a match exists. Such simple messages can be generated by the rules engine to produce data that when rendered, as discussed below provides informational depictions in different colors, e.g., red, yellow or green, which would correspond to different levels of match.

Alternatively, complex messages can be generated. Such complex messages can include textual content that conveys information regarding attributes of the automobiles/vehicles that were found to match the customer's criteria. Typically, such messages with textual content will include results of the search criteria used to find matches. With complex messages, the informational depictions can include part of the textual content, e.g., the criteria that matched or can include statements generated by the rules engine that summarizes the criteria.

Figure 3:
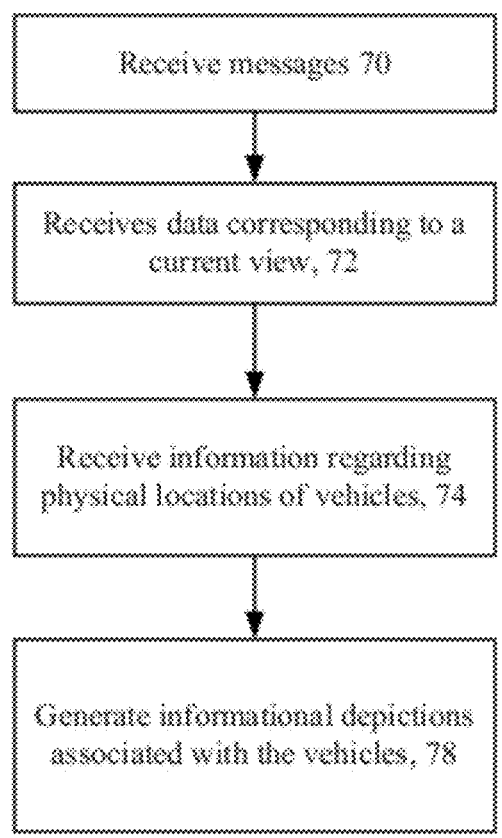

Referring to FIG. 3, the server 12 receives 70 the generated messages from the output of the rules engine and in some embodiments receives 72 data corresponding to a view of the environment, e.g., the dealer's lot containing the automobiles/vehicles, as viewed by the customer. The server 12 also receives 74 information that specifies the physical location of each of the automobiles/vehicles associated with the generated messages. The server generates 76 informational depictions based on the received messages and associates 78 the generated informational depictions with corresponding automobiles/vehicles in the dealer's lot.

Figure 8:
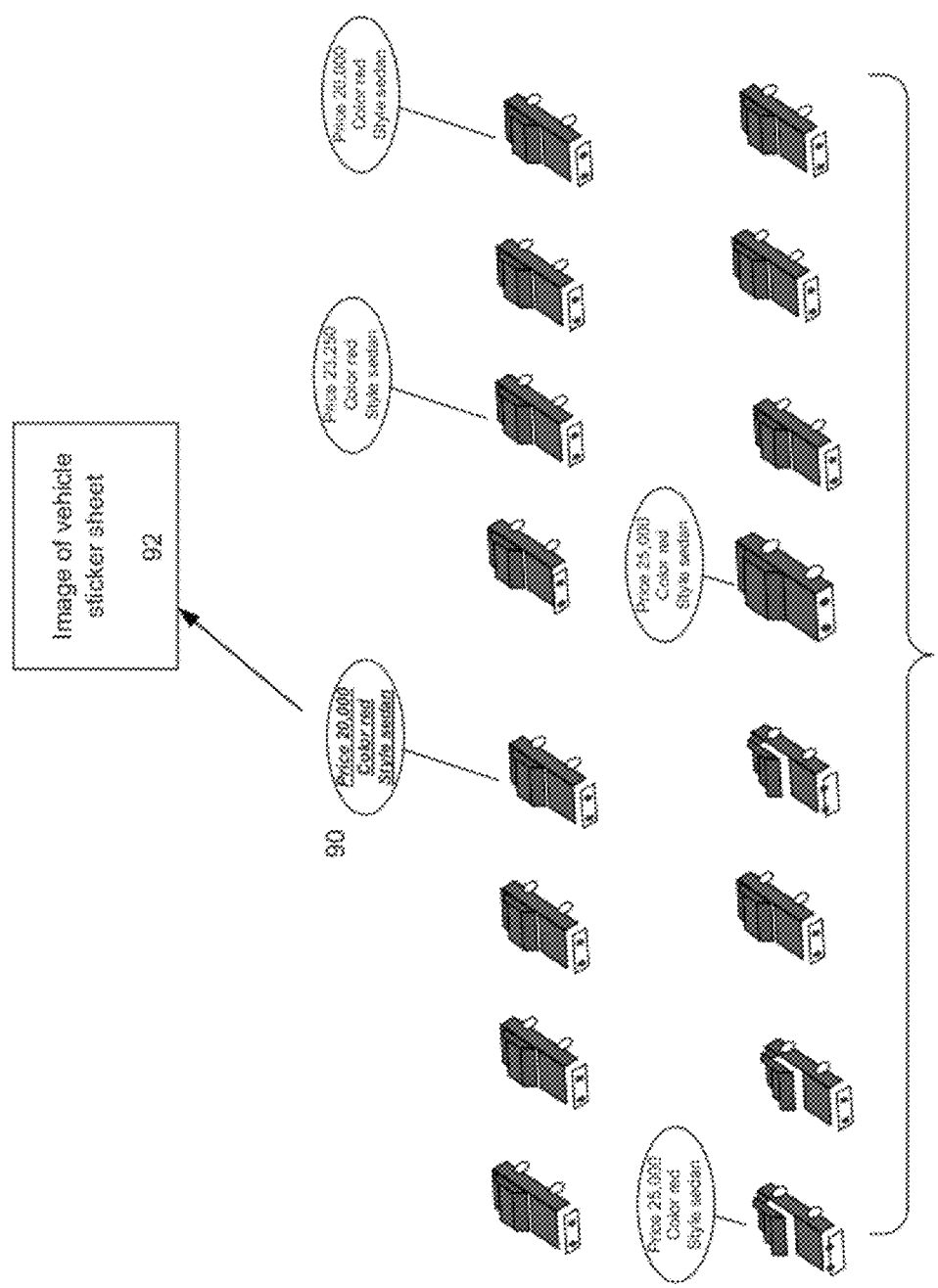
FIG. 8 is pictorial depiction of an exemplary rendition of informational depictions render on a real-world view of a dealer lot.

In one embodiment, the server 12 generates an image of representations of the automobiles/vehicles. The generated image is a real-world image depicting the automobiles/vehicles or it can be a morphed or virtual depiction (which may be less desired if the user is looking at that morphed or virtual image through eyeglasses). The generated image is augmented with a set of informational depictions of the generated messages. The informational depictions of the generated messages are positioned in the generated image in juxtaposition, e.g., over the representations of automobiles/vehicles in the image, for example, as illustrated in FIG. 8.

In another embodiment, the server 12, rather than generating an image of representations of automobiles/vehicles, the server 12 generates the informational depictions for the generated messages with positional information that when sent and rendered on a display device will depict the informational depictions projected onto a real-world view of the lot containing the automobiles/vehicles. That is, in these embodiments the real world view is provided from looking through a set of eyeglasses Exemplary eyeglasses are Wrap 920 VR Bundle from Vuzix Corporation 75 Town Centre Drive Rochester, N.Y. 14623. Such eyeglasses often referred to as video eyewear connects media players or video-out capable mobile phones or a laptop, netbook or desktop PC. Such eyewear typically includes a video eyewear a video e.g., VGA Adapter and tracker. Other examples from Vuzix include The Wrap™ 920AR augmented reality eyewear. Other examples include Z800 Pro AR head mounted display (single or dual VGA input version.) standard or ruggedized distributed by Cyber-World, Inc. 60 De Bresoles Unit 202 Montreal, QC, Canada. In general such eyewear is a wearable display that presents a virtual large screen, stereo video capture, 6-degrees of freedom and head tracking. This view is augmented with the set of informational depictions of the generated messages that are projected on screens of the glasses. The informational depictions of the generated messages are position in the generated image in juxtaposition, e.g., over the representations of the client systems in the image.

Figure 4:
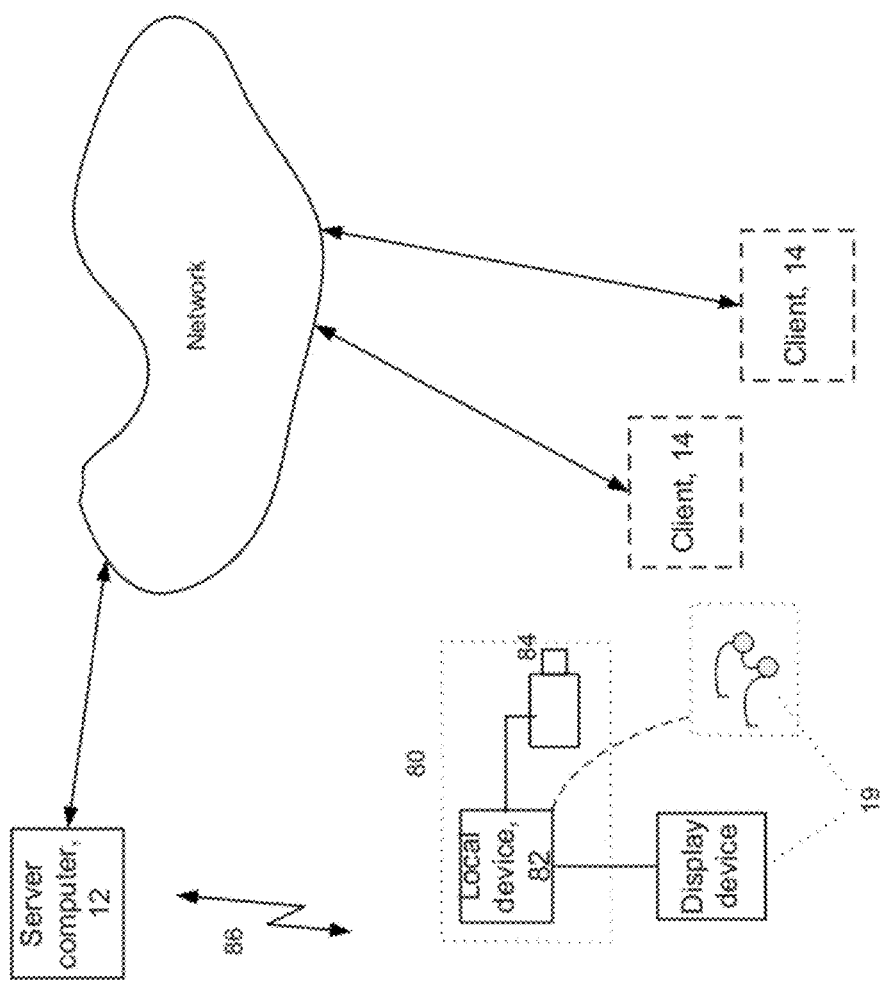
FIG. 4 is a block diagram.

Referring now to FIG. 4, a user, is outfitted with the device 19 (FIG. 1, either eyeglasses or tablet computer or other display type of device) that is configured to receive the generated augmentation and/or the generated, augmented image of the lot. In one embodiment, the eyeglasses mentioned above are used as the device 19. The eyeglasses allow the user to see through the glasses and observe the real world as a normal set of glasses. The eyeglasses are configured to receive the generated augmentation of the informational depictions and project the generated augmentation of the informational depictions onto the glasses such that the informational depictions are rendered in juxtaposition with corresponding ones of the client systems 14.

In another embodiment, a user is outfitted with a portable computer system 80. The device 19 is the display portion of the portable computer system 80 that is carried by the user. Examples include a tablet computer or a personal digital assistant. The system 80 includes a local computer 82 that processes an image of the scene received from, e.g., a camera 82 and applies the received augmentation to the generated image for rendering on display 84. Alternatively, the local computer 82 can receive the generated augmentation and the generated image from the server 12.

With the set of eyeglasses used as the display, the eyeglasses are configured to receive the generated image over a wireless or wired connection from either the local computer 82 or directly (not shown) if wireless from the server 12. The portable computing system 82 such as a personal digital assistant or a tablet computing device is typically configured to receive the generated augmented image over a wireless connection.

The server 12 is further configured to generate the informational depictions of the generated messages as pictorial representations that have text corresponding to the message contained in the pictorial representations. Examples include balloon depictions, callouts, cartoons, simple text boxes, etc. These generated messages are sent in a data stream 86 from the server 12 to the local device 82.

The server 12 is further configured to cause the informational depictions to be rendered by the display as positioned, e.g., over the automobiles/vehicles depicted in the image or the real-world actual view. In other embodiments, the system 10 has an image capture device 84 disposed to view the dealer's lot, either in a fixed position or attached to e.g., the computer 82 or otherwise stand-alone. From the image capture device 84 the computer 84 or sever 12 receives real-world, real time images the client systems 14. Alternatively, the image capture device 84 is mounted in or on the eyeglasses.

Figure 5:
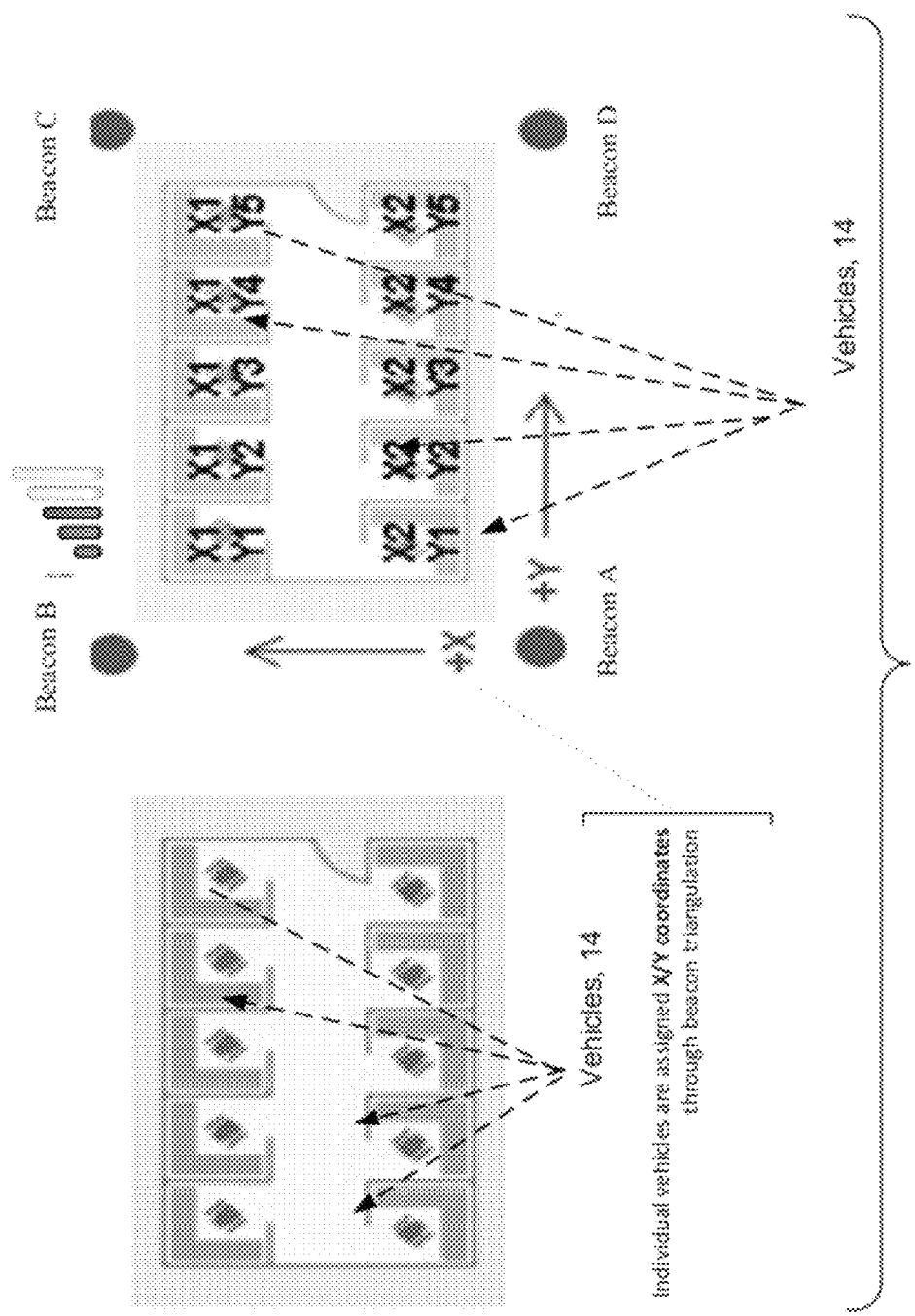
FIG. 5 is a pictorial depiction of a dealer lot containing a group of vehicles and beacons.

Referring now to FIG. 5, positional information regarding each of the automobiles/vehicles is provided to the server 12 (FIG. 1), as discussed below. Generally, the locations of the automobiles/vehicles are fixed. In one embodiment, the automobiles/vehicles contained in the image presented to the user will constantly change depending on the location and orientation of the user with respect to the automobiles/vehicles. For example, as the user walks through the lot different automobiles/vehicles will come into and go out of the field of view in the image. It would be desirable therefore for the server 12 (FIG. 1) to also have information regarding which systems are currently in the field of view of the display carried by the user, e.g., the eyeglasses. This can be accomplished by various techniques, discussed below.

Individual automobiles/vehicles are assigned X and Y coordinate positions so as to map the automobiles/vehicles to a plan of the dealer's lot. The lot can be outfitted with beacons, e.g., beacons A-D. These beacons operate using optical or radio frequency or acoustic signals. The client systems 14 (FIG. 1) are assigned X and Y coordinate positions through a triangulation process. The positions for each vehicle/automobile are stored in the one or more computers of the system 10 (FIG. 1). Other approaches can be used. For example, each vehicle/automobile can be provided with an individual beacon that transmits a signal identifying the automobile/vehicle, (e.g., by VIN or stock no. or the like) to which it is attached. In addition, the beacon on the individual automobile/vehicle can be programmed with the assigned position (space) of the automobile/vehicle in the lot.

The beacons A-D are configured to transmit signals and using conventional triangulation techniques through a receiver on the representative or prospective customer, determine the positional information. The server 12 receive this positional information from the computer system and analyze the received positional information from the computer system to determine the relative position of the display with respect to the automobiles/vehicles in the lot located in the environment to position the informational depictions from over the depicted representations of those automobiles/vehicles in the image.

In another embodiment, the system 10 has the one or more computer systems 12a-12i further configured to receive a map of the lot depicting where the automobiles/vehicles are located and receive a current image from the camera mounted on, e.g., the eyeglasses. The one or more computer systems 12a-12i, analyze the received image to produce positional information regarding the automobiles/vehicles in the image with respect to the received map and the current position and orientation of the representative or prospective customer. While eyeglasses or a display device can be used other types of augmenting media devices can be configured to receive the generated image.

Figure 6:
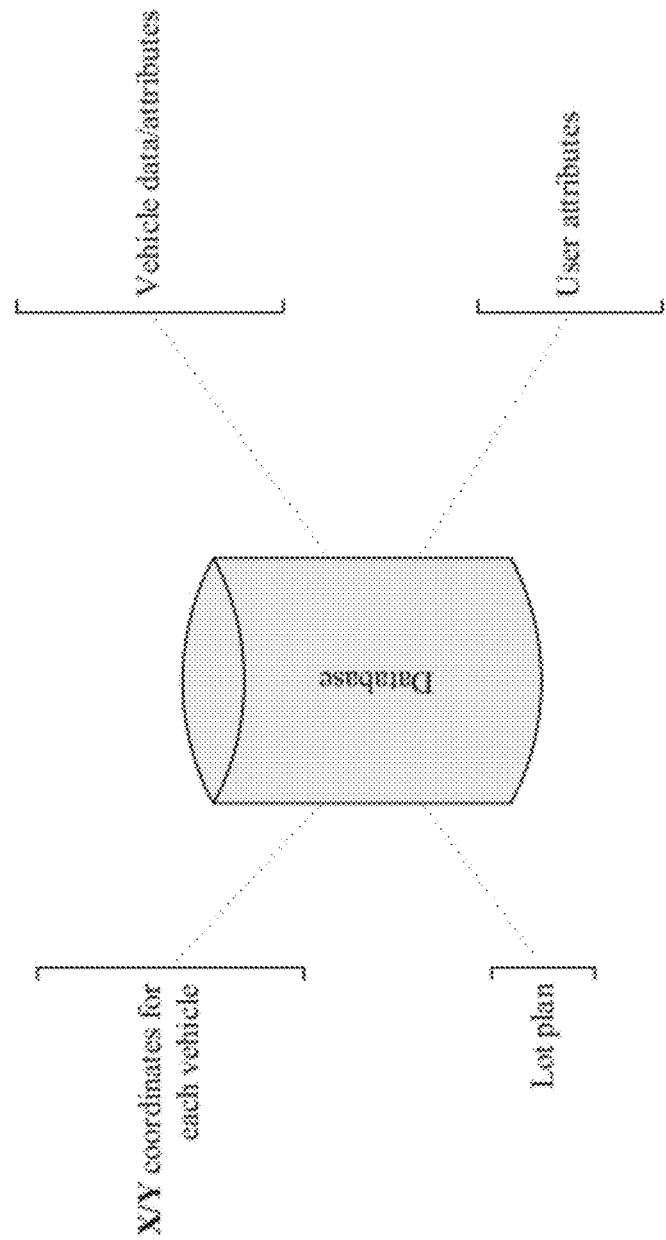
FIG. 6 is block diagram of a representation of information used in the system of FIG. 1.

Referring now to FIG. 6, a depiction of the types of data/information stored in the database 16 is shown. These data include the X and Y coordinates for each automobiles/vehicles, a lot plan, user attributes/user particulars, and information pertaining to each automobile/vehicle as discussed above. This database can be a local database associated with the dealer or can be a remote database associated with a manufacturer or a group of affiliated dealerships.

Figure 7:
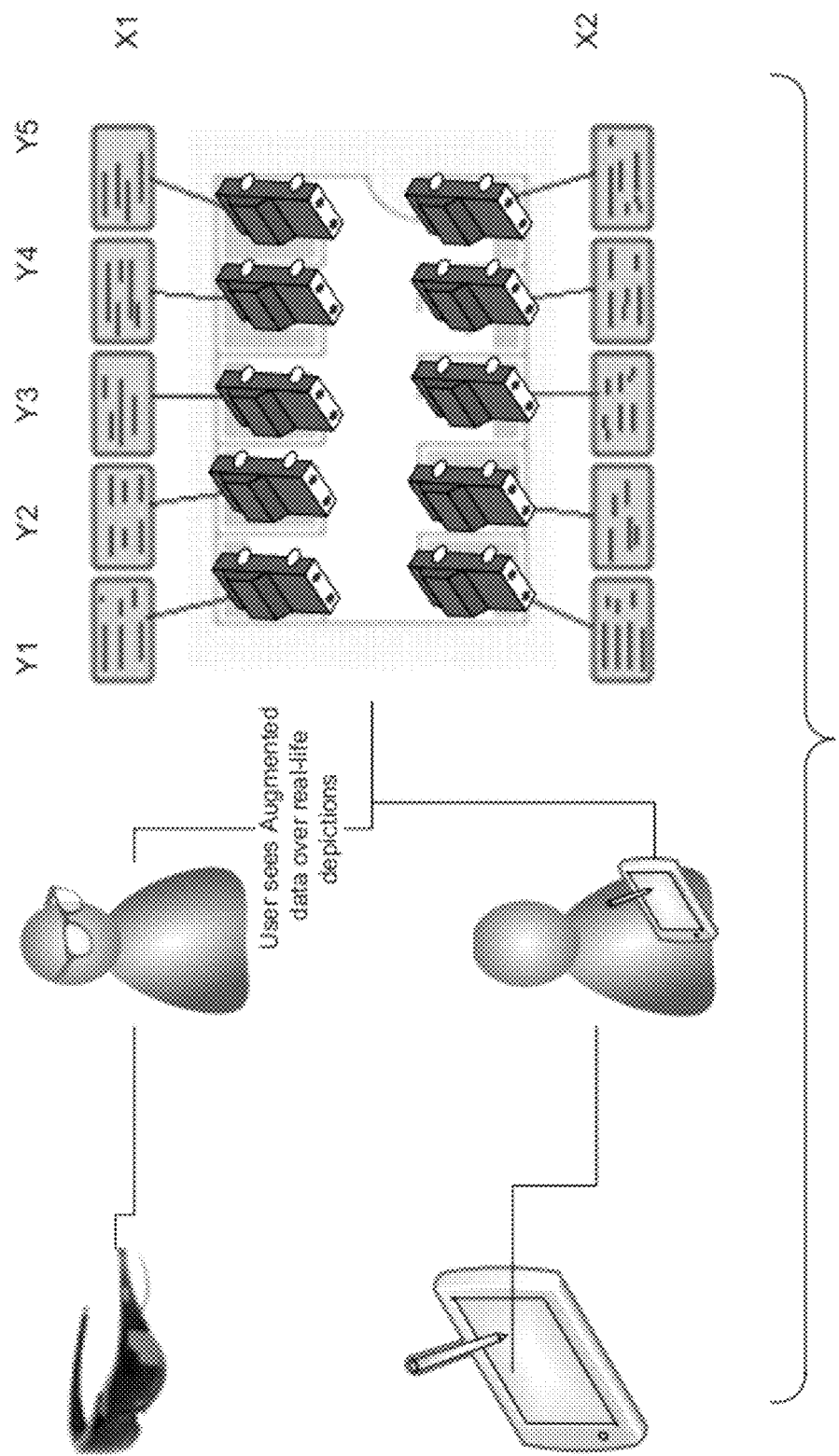
FIG. 7 is a pictorial depiction of a user viewing various vehicles on a dealer lot having informational depictions.

Referring to FIG. 7, a representative or prospective customer is outfitted with one of the portable stations mentioned above, e.g., the eyeglasses with a local computer, tablet computer, etc. The portable station using signals from the beacons A-D (FIG. 6) determine through triangulation the position of the representative or prospective customer using active or passive techniques. The position is mapped into the map of the dealer's lot. The representative or prospective customer position and orientation are determined relative to the X and Y coordinates of the locations of the client systems. This is accomplished by the server 12 (FIG. 1) comparing the user's current position in the X and Y coordinates to the assigned/mapped X and Y coordinates of automobiles/vehicles. Alternatively, the user's location can be determined based on the portable device having a beacon that is detected through triangulation. Other techniques such as Global Positioning Systems can be used to determine position.

The server 12 uses the representative or prospective customer position (that can change as the representative or prospective customer moves through the lot) and the X and Y coordinates automobiles/vehicles to generate the particular informational depictions, which the server 12 deems to be in the current field of view of the representative or prospective customer. The server 12 determines which information depictions to generate based on the positional information for the representative or prospective customer, as discussed above, and the positional information regarding the automobiles/vehicles.

The server 12 is configured to use the map of the dealer's lot and the analysis of the received image to produce positional information regarding the automobiles/vehicles in the image and hence in a current view of the representative or prospective customer. That information is used to decide which informational depictions are used to augment the image and where in the image the informational depictions should be rendered with respect to the automobiles/vehicles when the augmentation is displayed on the display device. The system 10 (FIG. 1) will cause the server 12 to position in the image, the informational depictions over the representations of those automobiles/vehicles that are contained in the image at the time of generation of the image.

Generally, the server 12 will generate the messages and likewise the informational depictions as the positions substantially change. The particular informational depictions that would be sent to the representative or prospective customer portable station would be those corresponding to the determined current view of the representative or prospective customer. In some implementations, where the lot is not very large all of the generated informational depictions can be sent to the representative or prospective customer portable station.

To determine orientation, a representative or prospective customer can signal the server 12 of the representative or prospective customer current orientation either manually or automatically, e.g., by wearing an electronic compass that can send a signal back to the server 12 giving the user's current orientation. In other simpler implementations, the server 12 can assume that the user is always facing in a particular direction. Other arrangements are possible.

Referring now to FIG. 8, the X and Y coordinate data of the client systems and generated informational depictions are processed to produce a feed that when rendered on e.g., virtual reality glasses (or a portable tablet computing device) renders the generated informational depictions in juxtaposition to (either the actual view of or an image of) those automobiles/vehicles that are determined by the one or more computers to be in a current view, as shown for a simple search for sedans that are red with a price in a range of $20,000 to $25,000. Any set of attributes can be searched and displayed. The generated informational depictions are overlaid through an augmented image of the real lot, and the produced feed is projected onto virtual reality glasses or rendered by a display portion of the portable tablet computing device, and so forth.

In one embodiment, the user can select one of the informational depictions (e.g., depiction 90) either by a signal when wearing the eyeglasses or via touching a display (tablet) or other user device or other techniques. Selection of one or more of the informational depictions, e.g., 90 can cause the system 10 to generate another display 92 that displays more details, such as an image of the vehicle's "sticker sheet" that is conventionally found on vehicles. This other display can be displayed over the display of FIG. 80, as shown or overlaid the display of FIG. 8 or displayed as a separate image.

A block diagram of components of the system 10 is also shown. User devices can be any sort of computing device capable of taking input from a user and communicating over a network (not shown) with server and/or with other client devices. For example, user device can be a mobile device, a desktop computer, a laptop, a cell phone, a personal digital assistant ("PDA"), a server, an embedded computing system, a mobile device, as well as the eyeglasses, and so forth. User devices include monitor which render visual representations.

Server can be any of a variety of computing devices capable of receiving information, such as a server, a distributed computing system, a desktop computer, a laptop, a cell phone, a rack-mounted server, and so forth. Server may be a single server or a group of servers that are at a same location or at different locations.

Server can receive information from user devices via a communication interface. Interfaces can be any type of interface capable of receiving information over a network, such as an Ethernet interface, a wireless networking interface, a fiber-optic networking interface, a modem, and so forth. Server also includes a processor and memory. A bus system (not shown), including, for example, a data bus and a motherboard, can be used to establish and to control data communication between the components of server.

Processor may include one or more microprocessors. Generally, processor may include any appropriate processor and/or logic that is capable of receiving and storing data, and of communicating over a network (not shown). Memory can include a hard drive and a random access memory storage device, such as a dynamic random access memory, machine-readable media, or other types of non-transitory machine-readable storage devices.

Components also include storage device, which is configured to store information, map, map templates, rules data for the rules, software for the rules engine, etc.

Embodiments can be implemented in digital electronic circuitry, or in computer hardware, firmware, software, or in combinations thereof. Apparatus of the invention can be implemented in a computer program product tangibly embodied or stored in a machine-readable storage device and/or machine readable media for execution by a programmable processor; and method actions can be performed by a programmable processor executing a program of instructions to perform functions and operations of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

Other embodiments are within the scope and spirit of the description claims. For example, due to the nature of software, functions described above can be implemented using software, hardware, firmware, hardwiring, or combinations of any of these. Features implementing functions may also be physically located at various positions, including being distributed such that portions of functions are implemented at different physical locations.

What is claimed is:

1. A system comprising: one or more computer systems comprising at least one memory and at least one processor, the one or more computer systems configured to: receive input data comprising a plurality of desired physical attributes of a desired product and user-preselected priorities associated with the desired physical attributes; store the input data in a database in communication with the one or more computer systems, the database holding a plurality of input data and records of an inventory of products; search by one or more of the desired physical attributes, the database, to determine matching products in the inventory of products that have physical attributes that match to the one or more desired physical attributes, the one or more computer systems further configured to further search the database to determine closely-matching products in the inventory of products that have physical attributes that match to at least some of the one or more desired physical attributes when no matching products are found, with the further search conducted based on the user-preselected priorities associated with the one or more desired physical attributes; generate a first set of messages based on the search, the first set of messages including at least some text corresponding to the one or more desired physical attributes of inventory matches, wherein the inventory matches include the matching products or the closely-matching products; generate a first set of informational depictions based on the first set of messages; receive a signal from an electronic compass associated with a display, wherein the display is associated with a portable computing system of the system in communication with the one or more computer systems and the signal indicates a current orientation of the display; generate positional information that associates the first set of informational depictions with representations of the inventory matches; cause the first set of informational depictions to be rendered on the display in juxtaposition with the representations of the inventory matches, wherein the representations of the inventory matches that are displayed in a current view of the inventory matches are based on inventory matches located within a current field of view of an image capture device of the portable computing device, the positional information, and a location of the portable computing system determined based on the received signal from the electronic compass; receive a selection from the portable computing system corresponding to one of the representations of the inventory matches; generate a second set of messages including additional details on physical attributes of an inventory match corresponding to the selected representation; generate a second set of informational depictions based on the second set of messages; and cause the second set of informational depictions to be rendered on the display;
cause either of the first set or the second set of informational depictions to be projected onto the display for informational depictions corresponding to inventory matches located within the current field of view of the image capture device; and wherein the representations of the inventory matches are real-world images of inventory matches.

2. The system of claim 1 further configured to: receive information specifying a map in rectilinear coordinates of physical locations of the inventory matches; receive location information of a current physical location of the portable computing system; and generate the positional information relative to the rectilinear coordinates of the physical locations of the inventory matches to associate the first set of informational depictions with the inventory matches that are displayed in the current view of the inventory matches according to the location information and the signal received from the electronic compass.

3. The system of claim 1 wherein the system is further configured to: generate an image depicting representations of the inventory matches residing in a physical location, the image augmented with the first set of informational depictions of the generated messages in juxtaposition with the representations of the inventory matches in the image.

4. The system of claim 1 wherein the system is further configured to: receive information specifying a map of physical locations of the inventory matches; receive location information from a global positioning system associated with the portable computing system; and generate the positional information relative to the physical locations of the inventory matches to associate the first set of informational depictions with the locations of the inventory matches that are displayed in the current view of the inventory matches according to the location information received from the global positioning system and the signal received from the electronic compass.

5. The system of claim 3 wherein the inventory matches are automobiles/vehicles and the one or more computer systems are further configured to: generate the image as a real-world image containing actual views of the automobiles/vehicles; and generate the first set of informational depictions as pictorial representations that are depicted over the corresponding matching actual views of the automobiles/vehicles.

6. A computer program product tangibly stored on a computer readable hardware storage device, the computer program product for searching product inventory of products, the computer program product executable on at least one processor of one or more computer systems comprising at least one memory, the computer program product comprising instructions to cause the at least one processor to: receive input data comprising a plurality of desired physical attributes of a desired product and user-preselected priorities associated with the desired physical attributes; store the input data in a database in communication with the one or more computer systems, the database holding a plurality of input data and records of an inventory of products; search, by one or more of the desired physical attributes, the database to determine matching products in the inventory of products that have physical attributes that match to the one or more desired physical attributes, the computer program product further comprising instructions to cause the at least one processor to further search the database to determine closely-matching products in the inventory of products that have physical attributes that match to at least some of the one or more desired physical attributes when no matching products are found, with the further search conducted based on the user-preselected priorities associated with the one or more desired physical attributes; generate a first set of messages based on the search, the first set of messages including at least some text corresponding to the one or more desired physical attributes of inventory matches, wherein the inventory matches include the matching products or the closely-matching products; generate a first set of informational depictions based on the first set of messages; receive a signal from an electronic compass associated with a display, wherein the display is associated with a portable computing system of the system in communication with the processor and the signal indicates a current orientation of the display; generate positional information that associates the first set of informational depictions with representations of the inventory matches; cause the first set of informational depictions to be rendered on the display in juxtaposition with the representations of the inventory matches, wherein the representations of the inventory matches that are displayed in a current view of the inventory matches is based on inventory matches located within a current field of view of an image capture device of the portable computing device, the positional information, and a location of the portable computing system determined based on the received signal from the electronic compass; receive a selection from the portable computing system corresponding to one of the representations of the inventory matches; generate a second set of messages including additional details on physical attributes of an inventory match corresponding to the selected representation; generate a second set of informational depictions based on the second set of messages; and cause the second set of informational depictions to be rendered on the display;
cause either of the first set or the second set of informational depictions to be projected onto the display for informational depictions corresponding to inventory matches located within the current field of view of the image capture device; and wherein the representations of the inventory matches are real-world images of inventory matches.

7. The computer program product of claim 6 further comprising instructions to: receive information specifying a map in rectilinear coordinates of physical locations of the inventory matches; and generate the positional information relative to the rectilinear coordinates of the physical locations of the inventory matches to associate the first set of informational depictions with the locations of the inventory matches that are displayed in the current view of the inventory matches according to the location information and the signal received from the electronic compass.

8. The computer program product of claim 6 further comprising instructions to: generate an image depicting representations of the inventory matches residing in a physical location, the image augmented with the first set of informational depictions of the generated messages in juxtaposition with the representations of the inventory matches in the image.

9. The computer program product of claim 6 wherein instructions to generate the positional information further comprise instructions to: receive information specifying a map of physical locations of the inventory matches; receive location information from a global positioning system associated with the portable computing system; and generate the positional information relative to the physical locations of the inventory matches to associate the first set of informational depictions with the locations of the inventory matches that are displayed in the current view of the inventory matches according to the location information received from the global positioning system and the signal received from the electronic compass.

10. The computer program product of claim 6 wherein the inventory matches are automobiles/vehicles and the computer program product further comprises instructions to: generate the image as a real-world image containing actual views of the automobiles/vehicles; and generate the first set of informational depictions as pictorial representations that are depicted over the corresponding matching actual views of the automobiles/vehicles.

11. A method comprising: receiving by one or more computer systems comprising at least one memory and at least one processor, input data comprising a plurality of desired physical attributes of a desired product and user-preselected priorities associated with the desired physical attributes; storing by one or more computer systems the input data in a database in communication with the one or more computer systems, the database holding a plurality of input data and records of an inventory of products; searching by the one or more computer systems by one or more of the desired physical attributes, the database, to determine matching products in the inventory of products that have physical attributes that match to the one or more desired physical attributes, the one or more computer systems further configured to further search the database to determine closely-matching products in the inventory of products that have physical attributes that match to at least some of the one or more desired physical attributes when no matches are found, with the further search conducted based on the user-preselected priorities associated with the one or more desired physical attributes; generating by the one or more computer systems a first set of messages based on the search, the first set of messages including text corresponding to the one or more desired physical attributes of inventory matches, wherein the inventory matches include the matching products or the closely-matching products; generating by the one or more computer systems a first set of informational depictions based on the first set of messages; receiving by the one or more computers a signal from an electronic compass associated with the display, wherein the display is associated with a portable computing system of the system in communication with the processor and the signal indicates a current orientation of the display; generating by the one or more computer systems positional information that associates the first set of informational depictions with representations of the inventory matches; causing by the one or more computer systems the first set of informational depictions to be rendered on the display in juxtaposition with the representations of the inventory matches, wherein the representations of the inventory matches that are displayed in a current view of the inventory matches is based on inventory matches located within a current field of view of an image capture device of the portable computing device, the positional information, and a location of the personal computing system determined based on the received signal from the electronic compass; receiving a selection from the portable computing system corresponding to one of the representations of the inventory matches; generating a second set of messages including additional details on desired physical attributes of an inventory match corresponding to the selected representation; generating a second set of informational depictions based on the second set of messages; and causing the second set of informational depictions based to be rendered on the display;

causing either of the first set or the second set of informational depictions to be projected onto the display for informational depictions corresponding to inventory matches located within the current field of view of the image capture device; and wherein the representations of the inventory matches are real-world images of inventory matches.

12. The method of claim 11 further comprising: receiving information specifying a map in rectilinear coordinates of physical locations of the inventory matches; receiving location information of a current physical location of the portable computing system; and generating the positional information relative to the rectilinear coordinates of the physical locations of the inventory matches to associate the first set of informational depictions with the inventory matches that are displayed in the current view of the inventory matches according to the location information and the signal received from the electronic compass.

13. The method of claim 11 further comprising: generating an image depicting representations of the inventory matches residing in a physical location, the image augmented with the first set of informational depictions of the generated messages in juxtaposition with the representations of the inventory matches in the image.

14. The method of claim 11 further comprising: receiving information specifying a map of physical locations of the inventory matches; receiving location information from a global positioning system associated with the portable computing system; and generating the positional information relative to the physical locations of the inventory matches to associate the first set of informational depictions with the locations of the inventory matches that are displayed in the current view of the inventory matches according to the location information received from the global positioning system and the signal received from the electronic compass.

15. The method of claim 11 wherein the inventory matches are automobiles/vehicles and the method further comprises: generating the image as a real-world image containing actual views of the automobiles/vehicles; and generating the first set of informational depictions as pictorial representations that are depicted over the corresponding matching actual views of the automobiles/vehicles.

\* \* \* \* \*